United States Patent Office 3,264,208
Patented August 2, 1966

3,264,208
CATALYTIC HYDROCARBON CONVERSION WITH THE USE OF A CRYSTALLINE ZEOLITE CONTAINING MANGANESE IONS
Charles J. Plank, Woodbury, and Edward J. Rosinski, Deptford, N.J., assignors to Mobil Oil Corporation, a corporation of New York
No Drawing. Filed June 30, 1964, Ser. No. 379,370
The portion of the term of the patent subsequent to July 7, 1981, has been disclaimed
15 Claims. (Cl. 208—120)

This application is a continuation-in-part of application Serial No. 161,237; Serial No. 161,241, now U.S. Patent 3,140,251; and Serial No. 42,284, now U.S. Patent 3,140,249.

This invention relates to catalyst compositions and more particularly to catalyst compositions comprising aluminosilicates containing both manganese cations and protons or proton precursors either alone or intimately admixed with a porous matrix and their method of preparation.

A considerable number of materials have heretofore been proposed as catalysts for the conversion of hydrocarbons into one or more desired products. In the catalytic cracking of hydrocarbon oils, for example, wherein hydrocarbon oils of higher boiling range are converted into hydrocarbons of lower boiling range, notably hydrocarbons boiling in the motor fuel range, the catalysts most widely used are solid materials which behave in an acidic manner whereby hydrocarbons are cracked. Although acidic catalysts of this type possess one or more desired characteristics, a great many of these catalysts have undesirable characteristics, such as lack of thermal stability, availability, or mechanical strength, etc., whereby a wide range of suitable properties cannot be maintained. Synthetic silica-alumina composites, the most popular catalysts known to have been proposed heretofore, provide limited yields of gasoline for a given yield of coke and further suffer the disadvantage of rapidly deteriorating and becoming inactive in the presence of steam, particularly at temperatures above 1000° F. Other catalysts less widely used include those materials of an argillaceous nature, e.g., bentonite and montmorillonite, which have been treated with acids to bring out their latent cracking characteristics. Catalysts of this general type are relatively inexpensive but are only moderately active and exhibit a decline in activity over periods of many conversion and regeneration cycles. Some synthetic materials, such as silica-magnesia complexes, are more active than conventional silica-alumina catalysts and undergo normal ageing but have limited utility because of their product distribution as evidenced, for example, by low octane number of the gasoline.

Other disadvantages of the heretofore proposed catalysts include poor activity, chemical stability and product distribution in obtaining desired yields of useful products.

The present invention is based on a discovery that aluminosilicates containing both hydrogen ions and manganese cations are highly active catalysts for a wide variety of chemical processes, particularly those chemical processes involving hydrocarbon conversion. The catalysts of this invention possess a wide spectrum in magnitude of catalytic activity; can be used in relatively small concentrations; and permit certain hydrocarbon conversion processes to be carried out under practicable and controllable rates at lower temperatures than those previously employed. In the catalytic cracking of hydrocarbon oils into hydrocarbon products of lower molecular weight, for example, the reaction rates per unit volume of catalyst that are obtainable by the catalysts of this invention vary up to many thousands times the rates achieved with the best siliceous catalyst heretofore proposed.

The high activity catalysts contemplated herein are aluminosilicate compositions which are strongly acidic in character as a result of treatment with a fluid medium containing manganese cations and hydrogen ions or ions capable of conversion to hydrogen ions. The product resulting from treatment with a fluid medium is an activated crystalline aluminosilicate in which the nuclear structure thereof has been modified primarily to the extent of having protons and manganese cations ionically bonded thereto.

In preparing the catalyst composition of this invention, the aluminosilicate can be contacted with a non-aqueous or aqueous fluid medium comprising a polar solvent or water solution containing the desired hydrogen ion or ion capable of conversion to a hydrogen ion and at least one manganese metal salt soluble in the fluid medium. Alternatively, the aluminosilicate can be first contacted with a fluid medium containing a hydrogen ion or ion capable of conversion to a hydrogen ion and then with a fluid medium containing at least one manganese salt. Similarly, the aluminosilicate can be first contacted with a fluid medium containing at least one manganese metal cation and then with a fluid medium containing a hydrogen ion or ion capable of conversion to a hydrogen ion or a mixture of both. Although any one of the above three methods can be used to prepare the novel catalyst compositions of the instant invention, the first method, i.e., treatment with a fluid medium containing both a hydrogen ion or ion capable of conversion to a hydrogen ion and a manganese cation, is the most preferred. Additionally, water is the preferred medium for reasons of economy and ease of preparation in large scale operations involving continuous or batchwise treatment. Similarly, for this reason, organic solvents are less preferred but can be employed providing the solvent permits ionization of the acid, ammonium compound and manganese salt. Typical solvents include cyclic and acyclic ethers such as dioxane, tetrahydrofuran, ethyl ether, diethyl ether, diisopropyl ether, and the like; ketones such as acetone and methyl ethyl ketone; esters such as ethyl acetate, propyl acetate; alcohols such as ethanol, propanol, butanol, etc.; and miscellaneous solvents such as dimethylformamide, and the like.

The hydrogen ion, ammonium ion or manganese cation may be present in the fluid medium in an amount varying within wide limits depending upon the pH of the fluid medium. Where the aluminosilicate material has a molar ratio of silica to alumina greater than about 5.0 the fluid medium may contain a hydrogen ion, manganese cation, ammonium ion, or mixtures thereof, equivalent to a pH value ranging from less than 1.0 up to a pH value of about 12.0. Within these limits, pH values for fluid media containing a manganese cation and/or an ammonium ion range from 3.5 to 10.0 and are preferably between a pH value of 4.5 and 8.5. For fluid media containing a hydrogen ion alone or with a manganese cation, the pH values range from less than 1.0 up to about 7.0 and are preferably within the range of less than 1.0 up to 4.5. Where the molar ratio of silica to alumina is greater than about 2.2 and less than about 5.0 the pH value for fluid media containing a hydrogen ion or metal cation ranges from 3.8 to 8.5. Where the ammonium ions are employed, either alone or in combination with manganese cations, the pH value ranges from 4.5 to 9.5 and is preferably within the limit of 4.5 to 8.5. Where the aluminosilicate material has a molar ratio of silica to alumina of less than about 3.0, the preferred medium is a fluid medium containing an ammonium ion instead of a hydrogen ion. Thus, depending upon the silica to alumina ratio, the pH value can vary within rather wide limits. In those instances where the fluid medium containing an acid is unfavorable to the molecular structure of the aluminosilicate, a fluid medium may consist, for example, of a vaporized ammonium compound, such as ammonium chloride, or an aqueous or a non-aqueous medium containing the same or organic nitrogen bases or salts thereof. In this manner, aluminosilicates otherwise unsuitable for treatment with an acid-containing fluid medium are readily activated to provide useful catalyst compositions.

In carrying out the treatment with the fluid medium, the procedure employed comprises contacting an aluminosilicate until such time as the alkali metal cations originally present are substantially exhausted. Alkali metal cations, if present in the treated aluminosilicate, tend to suppress or limit catalytic properties, the activity of which, as a general rule, decreases with increasing content of these metallic cations. Effective treatment with the fluid medium to obtain a modified aluminosilicate having high catalytic activity will vary, of course, with the duration of the treatment and the temperature at which the treatment is carried out. Elevated temperatures tend to hasten the speed of treatment whereas the duration thereof varies inversely with the general concentration of ions in the fluid medium. In general, the temperatures employed range from below ambient room temperature of 24° C. up to temperatures below the decomposition temperature of the aluminosilicate. Following the fluid treatment, the treated aluminosilicate is washed with water, preferably distilled water, until the effluent wash water has a pH value of wash water, i.e., between 5 and 8. The aluminosilicate material can thereafter be analyzed for metallic content by methods well known in the art. Analysis also involves analyzing the effluent wash for anions obtained in the wash as a result of the treatment, as well as determination of and correction for anions that pass into the effluent wash from soluble substances, or decomposition products of insoluble substances, which are otherwise present in the aluminosilicate as impurities.

The treatment of the aluminosilicate with the fluid medium or media may be accomplished in a batchwise or continuous method under atmospheric, superatmospheric or subatmospheric pressures. A solution of the hydrogen ions, ammonium ions and manganese metal cations in the form of a molten material, aqueous or non-aqueous solution may be passed slowly through a fixed bed of aluminosilicate. If desired, hydrothermal treatment or corresponding non-aqueous treatment with polar solvents may be effected by introducing the aluminosilicate and fluid medium into a closed vessel maintained under autogenous pressure. Similarly, treatments involving fusion or vapor phase contact may be employed providing the melting point or vaporization temperature of the acid or ammonium compound is below the decomposition temperature of the aluminosilicate.

A wide variety of acidic compounds can be employed with facility as a source of hydrogen ions and include both inorganic and organic acids.

Representative inorganic acids which can be employed include acids such as hydrochloric acid, hypochloric acid, chloroplatinic acid, sulfuric acid, sulfurous acid, hydrosulfuric acid, peroxydisulfonic acid ($H_2S_2O_8$), peroxymonosulfuric acid ($H_2SO_5$), dithionic acid ($H_2S_2O_6$), sulfamic acid ($H_2NSO_3H$), amidodisulfonic acid $$(NH(SO_3H)_2)$$

chlorosulfuric acid, thiocyanic acid, hyposulfurous acid ($H_2S_2O_4$), pyrosulfuric acid ($H_2S_2O_7$), thiosulfuric acid ($H_2S_2O_3$), nitrosulfonic acid ($HSO_3 \cdot NO$), hydroxylamine disulfonic acid (($(HSO_3)_2NOH$), nitric acid, nitrous acid, hyponitrous acid, carbonic acid and the like.

Typical organic acids which find utility in the practice of the invention include monocarboxylic, dicarboxylic and polycarboxylic acids which can be aliphatic, aromatic and cycloaliphatic, in nature.

Representative aliphatic monocarboxylic, dicarboxylic and polycarboxylic acids include the saturated and unsaturated, substituted and unsubstituted acids such as formic acid, acetic acid, chloroacetic acid, dichloroacetic acid, trichloroacetic acid, bromoacetic acid, propionic acid, 2-bromopropionic acid, 3-bromopropionic acid, lactic acid, n-butyric acid, isobutyric acid, crotonic acid, n-valeric acid, isovaleric acid, n-caproic acid, oenanthic acid, pelargonic acid, capric acid, undecyclic acid, lauric acid, myristic acid, palmitic acid, stearic acid, oxalic acid, malonic acid, succinic acid, glutaric acid, adipic acid, pimilic acid, suberic acid, azelaic acid, sebacic acid, alkylsuccinic acid, alkenylsuccinic acid, maleic acid, fumaric acid, itaconic acid, citraconic acid, mesaconic acid, glutonic acid, musconic acid, ethylidene malonic acid, isopropylidene malonic acid, allyl malonic acid.

Representative aromatic and cycloaliphatic monocarboxylic, dicarboxylic and polycarboxylic acids include 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, 1,8-naphthalenedicarboxylic acid, 1,2-naphthalenedicarboxylic acid, tetrahydrophthalic acid, 3-carboxy-cinnamic acid, hydrocinnamic acid, pyrogallic acid, benzoic acid, ortho-, meta- and para-methyl, hydroxy, chloro, bromo- and nitro-substituted benzoic acid, phenylacetic acid, mandelic acid, benzylic acid, benzenesulfonic acid, toluenesulfonic acid, methanesulfonic acid and the like.

Other sources of hydrogen ions include carboxy polyesters prepared by the reaction of an excess polycarboxylic acid or an anhydride thereof and a polyhydric alcohol to provide pendant carboxyl groups.

Still other materials capable of providing hydrogen ions are ion exchange resins having exchangeable hydrogen ions attached to base resins comprising cross-linked resinous polymers of monovinyl aromatic monomers and polyvinyl compounds. These resins are well known materials which are generally prepared by copolymerizing in the presence of a polymerization catalyst one or more monovinyl aromatic compounds, such as styrene, vinyl toluene, vinyl xylene, with one or more divinyl aromatic compounds such as divinyl benzene, divinyl toluene, divinyl xylene, divinyl naphthalene and divinyl acetylene. Following copolymerization, the resins are further treated with suitable acids to provide the hydrogen form of the resin.

Still another class of compounds which can be employed are ammonium compounds which decompose to provide hydrogen ions when an aluminosilicate treated with a solution of said ammonium compounds is subjected to temperatures below the decomposition temperature of the aluminosilicate.

Representative ammonium compounds which can be employed include ammonium chloride, ammonium bromide, ammonium iodide, ammonium carbonate, ammonium bicarbonate, ammonium sulfate, ammonium sulfide, ammonium thiocyanate, ammonium dithiocarbamate, ammonium peroxysulfate, ammonium acetate, ammonium tungstate, ammonium hydroxide, ammonium molybdate, ammonium benzoate, ammonium borate, ammonium carbamate, ammonium sesquicarbonate, ammonium chloroplumbate, ammonium citrate, ammonium dithionate, ammonium fluoride, ammonium gallate, ammonium nitrate, ammonium nitrite, ammonium formate, ammonium propionate, ammonium butyrate, ammonium valerate, ammonium lactate, ammonium malonate, ammonium oxalate, ammonium palmitate, ammonium tartarate, and the like. Still other ammonium compounds which can be employed include tetraalkyl and tetraaryl ammonium salts such as tetramethylammonium hydroxide, trimethylammonium hydroxide. Other compounds which can be employed are nitrogen bases such as the salts of guanidine, pyridine, quinoline, quaternary ammonium hydroxides, etc.

A wide variety of manganese compounds can be employed with facility as a source of manganese ions. Operable compounds include chlorides, bromides, iodides, carbonates, bicarbonates, sulfates, sulfides, thiocyanates, peroxysulfates, acetates, benzoates, citrates, fluorides, nitrates, formates, propionates, butyrates, valerates, lactates, malonates, oxalates, palmitates, hydroxides, tartarates, and the like. The only limitation on the particular manganese metal salt or salts employed is that it be sufficiently soluble in the fluid medium in which it is used to give the necessary rare earth ion transfer. The preferred manganese salts are the chlorides, nitrates and sulfates.

Aluminosilicates which are treated with a fluid medium or media in the manner above-described include a wide variety of aluminosilicates both natural and synthetic which have a crystalline structure. However, it has been found that exceptionally superior catalysts can be obtained when the starting aluminosilicate has a crystalline structure and possesses at least 0.5, and preferably 0.6 to 1.0, equivalents of metal cations per gram atom of aluminum. The aluminosilicates can be described as a three-dimensional framework of $SiO_4$ and $AlO_4$ tetrahedra in which the tetrahedra are cross-linked by the sharing of oxygen atoms whereby the ratio of total aluminum and silicon atoms to oxygen atoms is 1:2. In their hydrated form, the aluminosilicates may be represented by the formula:

$$M_{2/n}O:Al_2O_3:w\ SiO_2:YH_2O$$

wherein M represents at least one cation which balances the electrovalence of the tetrahedra, $n$ represents the valence of the cation, $w$ the moles of $SiO_2$ and Y the moles of $H_2O$. The cation can be any of a number of metal ions, depending upon whether the aluminosilicate is synthesized or occurs naturally.

Typical cations include sodium, lithium, potassium, silver, magnesium, calcium, zinc, barium, iron, nickel, cobalt and manganese. Although the proportions of inorganic oxides in the silicates and their spatial arrangements may vary affecting distinct properties in the aluminosilicate the main characteristic of these materials is their ability to undergo dehydration without substantially affecting the $SiO_4$ and $AlO_4$ framework.

Aluminosilicates falling within the above formula are well known and include synthesized aluminosilicates, natural aluminosilicates, and certain caustic treated clays. Among the preferred aluminosilicates one can include Zeolites A, L, D, R, S, T, Z, E, F, Q, B, levynite, dachiarite, erionite, faujasites, such as X and Y types, analcite, paulingite, noselite, phillipsite, brewsterite, flakite, datolite, chabazite, gmelinite, leucite, scapolite, mordanite as well as certain caustic treated clays such as montmorillonite and kaolin families. The particularly preferred aluminosilicates are those having pore diameters of at least about 4 Angstroms.

Other synthesized crystalline aluminosilicates include those designated at ZK-4, Zeolite α and ZK-5.

ZK-4 can be represented in terms of mole ratios of oxides as:

0.1 to $0.3R:0.7$ to $1.0M_{2/n}O:Al_2O_3:2.5$ to $4.0\ SiO_2:YH_2O$ wherein R is a member selected from the group consisting of methylammonium oxide, hydrogen oxide and mixtures thereof with one another, M is a metal cation of $n$ valence, and Y is any value from about 3.5 to 5.5. As synthesized, Zeolite ZK-4 contains primary sodium cations and can be represented by unit cell formula:

$$Na_{7.5\ 2}H_{2\ .5}[9\pm2AlO_2\cdot15\pm2SiO_2]$$

The major lines of the X-ray diffraction pattern of ZK-4 are set forth in Table I below:

TABLE I

| d value of reflection in A.: | 100I/Io |
|---|---|
| 12.00 | 100 |
| 9.12 | 29 |
| 9.578 | 73 |
| 7.035 | 52 |
| 6.358 | 15 |
| 5.426 | 23 |
| 4.262 | 11 |
| 4.062 | 49 |
| 3.662 | 65 |
| 3.391 | 30 |
| 3.254 | 41 |
| 2.950 | 54 |
| 2.725 | 10 |
| 2.663 | 7 |
| 2.593 | 15 |
| 2.481 | 2 |
| 2.435 | 1 |
| 2.341 | 2 |
| 2.225 | 2 |
| 2.159 | 4 |
| 2.121 | 5 |
| 2.085 | 2 |
| 2.061 | 2 |
| 2.033 | 5 |
| 1.900 | 2 |
| 1.880 | 2 |
| 1.828 | 1 |
| 1.813 | 1 |
| 1.759 | 1 |
| 1.735 | 1 |
| 1.720 | 5 |
| 1.703 | 1 |
| 1.669 | 2 |
| 1.610 | 1 |
| 1.581 | 2 |
| 1.559 | 1 |

ZK-4 can be prepared by preparing an aqueous solution of oxides containing as $Na_2O$, $Al_2O_3$, $SiO_2$, $H_2O$ and tetramethylammonium ion having a composition, in terms of oxide mole ratios, which falls within the following ranges:

$SiO_2/Al_2O_3$ 2.5 to 11

$$\frac{Na_2O}{Na_2O+[(CH_3)_4N]_2O}\ 0.5\ to\ 2.5$$

$$\frac{H_2O}{Na_2O+[(CH_3)_4N]_2O}\ 25\ to\ 50$$

$$\frac{Na_2O+[(CH_3)_4N]_2O}{SiO_2}\ 1\ to\ 2$$

maintaining the mixture at a temperature of about 100° C. to 120° C. until the crystals are formed, and separating the crystals from the mother liquor. The crystal material is thereafter washed until the wash effluent has a pH essentially that of wash water and subsequently dried.

Zeolite α can be represented in terms of mole ratios of oxides as follows:

0.2 to $0.4R:0.6$ to $0.8M_{2/n}O:Al_2O_3:4.0$ to $6.0\ SiO_2:YH_2O$ wherein R is a member selected from the group consisting of methylammonium oxide, hydrogen and mixtures thereof, M is a metal cation of $n$ valence and $y$ the moles of $H_2O$.

Zeolite α is prepared in a similar manner as ZK-4 with the exception that mole ratio of silica to alumina is at least 20 to 1, the mole ratio of [(CH₃)₄N]₂O to Na₂O is about 10 to 1 and the forming temperature is about 60 to 90° C.

ZK-5 can be represented by composition in terms of mole ratios of oxides as:

$$0.3 \text{ to } 0.7 R_{2/m}O : 0.3 \text{ to } 0.7 M_{2/n}O : 1 Al_2O_3 : 4.0 \text{ to } 6.0 SiO_2 \cdot YH_2O$$

wherein R is selected from the group consisting of a nitrogen-containing cation derived from N,N'-dimethyltriethylenediammonium ion and mixtures of said cation and hydrogen and m is the valence thereof; M is a metal and n the valence thereof and Y is any value from about 6 to about 10.

The major lines of the X-ray diffraction pattern of ZK-5 are set forth in Table II below. In obtaining the X-ray diffraction powder patterns, standard techniques were employed. The radiation was the Kα doublet of copper, and a Geiger counter spectrometer with a strip chart pen recorder was used. The peak heights, I, and the positions as a function of 2θ, where θ is the Bragg angle, were read from the spectrometer chart. From these, the relative intensities, 100I/Io where Io is the intensity of the strongest line or peak, and d(obs), the interplanar spacing in A., corresponding to the recorded lines were calculated.

TABLE II

| hkl | I/Io×100 | d, A |
|---|---|---|
| 110 | 18 | 13.3 |
| 200 | 100 | 9.41 |
| 220 | 6 | 6.62 |
| 310 | 41 | 5.93 |
| 222 | 48 | 5.41 |
| 321 | 2 | 5.03 |
| 400 | 6 | 4.69 |
| 330 | 50 | 4.41 |
| 420 | 34 | 4.19 |
| 332 | 22 | 3.98 |
| 422 | 18 | 3.81 |
| 510 | 6 | 3.66 |
| 521 | 13 | 3.41 |
| 530, 433 | 35 | 3.21 |
| 611 | 28 | 2.02 |
| 620 | 21 | 2.94 |
| 541 | 2 | 2.88 |
| 622 | 26 | 2.81 |
| 631 | 9 | 2.75 |
| 543, 710, 550 | 11 | 2.64 |
| 640 | 2 | 2.59 |
| 721, 633, 552 | 9 | 2.54 |
| 730 | 3 | 2.45 |
| 732, 651 | 1 | 2.37 |
| 811, 741, 554 | 2 | 2.30 |
| 822, 660 | 3 | 2.20 |
| 831, 750, 743 | 2 | 2.17 |
| 662 | 1 | 2.14 |
| 910, 833 | 3 | 2.06 |
| 842 | 2 | 2.04 |
| 921, 761, 655 | 3 | 2.02 |
| 830, 851, 754 | ½ | 1.97 |
| 932, 763 | 2 | 1.93 |
| 941, 853, 770 | 2 | 1.89 |
| 10, 00, 860 | 5 | 1.87 |
| 10, 2, 0, 862 | 5 | 1.83 |
| 10, 3, 1, 952, 765 | 5 | 1.79 |

ZK-5 can be prepared by preparing an aqueous solution of oxides containing Na₂O, Al₂O₃, SiO₂, H₂O and N,N'-dimethyltriethylenediammonium ion having a composition, in terms of oxide mole ratios, which falls within the following ranges:

$SiO_2/Al_2O_3$ of from about 2.5 to 15

$\dfrac{Na_2O}{Na_2O + C_8H_{18}N_2O}$ of from about 0.1 to 2.5

$\dfrac{H_2O}{Na_2O + C_8H_{18}N_2O}$ of from about 25 to 50

$\dfrac{Na_2O + C_8H_{18}N_2O}{SiO_2}$ of from about 1 to 2 maintaining the mixture at a temperature of about 90° C. to 120° C. until the crystals are formed, and separating the crystals from the mother liquor. The crystal material is thereafter washed until the wash effluent has a pH essentially that of wash water and subsequently dried.

Other aluminosilicates which can be used are caustic treated clays.

Of the clay materials, montmorillonite and kaolin families are representative types which include the sub-bentonites such as bentonite and the kaolins commonly identified as Dixie, McNamee, Georgia and Florida clays in which the main mineral constituent is halloysite, kaolinite, dickite, nacrite, or anauxite. Such clays may be used in the raw state as originally mined or initially subjected to calcination, acid treatment or chemical modification. In order to render the clays suitable for use, however, the clay material is treated with sodium hydroxide or potassium hydroxide, preferably in admixture with a source of silica, such as sand, silica gel or sodium silicate, and calcined at temperatures ranging from 230° F. to 1600° F. Following calcination, the fused material is crushed, dispersed in water and digested in the resulting alkaline solution. During the digestion, materials with varying degrees of crystallinity are crystallized out of solution. The solid material is separated from the alkaline material and thereafter washed and dried. The treatment can be effected by reacting mixtures falling within the following weight ratios:

Na₂O/clay (dry basis) 1.0–6.6 to 1
SiO₂/clay (dry basis) 0.01–3.7 to 1
H₂O/Na₂O (mole ratio) 35–100 to 1

It is to be understood that mixtures of the various aluminosilicates previously set forth can be employed as well as individual aluminosilicates.

Another and more preferred embodiment of this invention resides in incorporating the aluminosilicate in a porous matrix. The active aluminosilicate component prepared in the foregoing manner can be combined, dispersed or otherwise intimately admixed with a porous matrix in such proportions that the resulting product contains from about 1 to 95 percent by weight, and preferably from about 2 to 80 percent by weight, of the aluminosilicate in the final composite. It is to be understood that the incorporation of the aluminosilicate into the porous matrix can be accomplished either before, after, or during treatment with the fluid medium or media. Thus, it is possible to treat an aluminosilicate with one fluid medium, e.g., one containing manganese cations, incorporate the treated aluminosilicate into a porous matrix, and then further treat the resulting composition with another fluid medium containing hydrogen ions, hydrogen percursors or mixtures thereof; as well as treating an aluminosilicate with any of the fluid medium or media previously set forth either before or after incorporation of the aluminosilicate into a porous matrix.

The term "porous matrix" includes organic and/or inorganic compositions with which the aluminosilicate can be combined, dispersed or otherwise intimately admixed wherein the matrix may be active or relatively inactive. It is to be understood that porosity of the compositions employed as a matrix can either be inherent in the particular material or it can be introduced by mechanical or chemical means. Representative matrices which can be employed include metals and alloys thereof, sintered metals and sintered glass, asbestos, silicon carbide aggregates, pumice, firebrick, diatomaceous earths, activated charcoal, refractory oxides, organic resins, such as polyepoxides, polyamines, polyesters, vinyl resins, phenolics, amino resins, mellamines, acrylics, alkyds, epoxy resins, etc., and inorganic oxide gels. Of these matrices, the inorganic oxide gels are particularly preferred because their superior porosite, attrition resistance, and stability under reaction conditions, especially those reaction conditions encountered in the cracking of gas oil.

The aluminosilicate-inorganic oxide gel compositions can be prepared by several methods wherein the aluminosilicate is reduced to a particle size less than 40 microns, preferably within the range of 1 to 10 microns, and intimately admixed with an inorganic oxide gel while the latter is in a hydrous state such as in the form of a hydrosol, hydrogel, wet gelatinous precipitate or a mixture thereof. Thus, finely divided active aluminosilicates can be mixed directly with a siliceous gel formed by hydrolyzing a basic solution of alkali metal silicate with an acid such as hydrochloric, sulfuric, etc. The mixing of the two components can be accomplished in any desired manner, such as in a ball mill or other types of kneading mills. The aluminosilicate also may be dispersed in a hydrosol obtained by reacting an alkali metal silicate with an acid or alkaline coagulant. The hydrosol is then permitted to set in mass to a hydrogel which is thereafter dried and broken into pieces of desired shape or dried by conventional spray drying techniques or dispersed through a nozzle into a bath of oil or other water-immiscible suspending medium to obtain spheroidally shaped "bead" particles of catalyst such as described in U.S. Patent 2,384,946. The aluminosilicate-siliceous gel thus obtained is washed free of soluble salts and thereafter dried and/or calcined as desired. The total alkali metal content of the resulting composite, including alkali metals which may be present in the aluminosilicate as an impurity, is less than about 4 percent and preferably less than about 3 percent by weight based on the total composition. If an inorganic oxide gel matrix is employed having too high an alkali metal content, the alkali metal content can be reduced by treatment with the fluid media previously set forth either before or after drying.

In a like manner, the active aluminosilicate may be incorporated with an aluminiferous oxide. Such gels and hydrous oxides are well known in the art and may be prepared, for example, by adding ammonium hydroxide, ammonium carbonate, etc., to a salt of aluminum, such as aluminum chloride, aluminum sulfate, aluminum nitrate, etc., in an amount sufficient to form aluminum hydroxide which, upon drying, is converted to alumina. The aluminosilicate may be incorporated with the aluminiferous oxide while the latter is in the form of hydrosol, hydrogel or wet gelatinous precipitate or hydrous oxide.

The inorganic oxide gel may also consist of a semiplastic or plastic clay mineral. The aluminosilicate can be incorporated in the clay simply by blending the two and fashioning the mixture into desired shapes. Suitable clays include attapulgite, kaolin, sepeolite, polygarskite, kaolinite, plastic ball clays, bentonite, montmorillonite, illite, chlorite, etc.

The inorganic oxide gel may also consist of a plural gel comprising a predominant amount of silica with one or more metals or oxides thereof selected from Groups IB, II, III, IV, V, VI, VII and VIII of the Periodic Table. Particular preference is given to plural gels of silica with metal oxides of Groups IIA, III and IVA of the Periodic Table, especially wherein the metal oxide is rare earth oxide, magnesia, alumina, zirconia, titania, beryllia, thoria or combinations thereof. The preparation of plural gels is well known and generally involves either separate precipitation or coprecipitation techniques in which a suitable salt of the metal oxide is added to an alkali metal silicate and an acid or base, as required, is added to precipitate the corresponding oxide. The silica content of the siliceous gel matrix contemplated herein is generally within the range of 55 to 100 weight percent with the metal oxide content ranging from 0 to 45 percent. Minor amounts of promoters of other materials which may be present in the composition include cerium, chromium, cobalt, tungsten, uranium, platinum, lead, zinc, calcium, magnesium, barium, lithium, nickel and their compounds as well as silica, alumina, silica alumina, or other siliceous oxide combinations as fines in amounts ranging from 5 to 40 percent by weight based on the finished catalyst.

Other preferred matrices include powdered metals, such as aluminum, stainless steel, and powders of refractory oxides, such as $\alpha$ alumina etc., having very low internal pore volume. These materials have substantially no inherent catalytic activity of their own.

As has heretofore been pointed out, the novel catalysts of this invention are compositions comprising an aluminosilicate containing both hydrogen ions or ions capable of conversion to hydrogen ions and manganese cations with the only limitation being that in no instance should there be any more than 0.25 and more preferably 0.15 equivalent per gram atom of aluminum of alkali metal associated with the aluminosilicate either alone or admixed with a porous matrix.

Within the above limits of the novel catalyst compositions of this invention, it is preferred that there be a minimum amount of alkali metal cations associated therewith since the presence of these metals tends to suppress or limit catalytic properties, the activity of which, as a general rule, decreases with increasing content of alkali metal cations. It is also preferred that the novel compositions have at least 0.8 and more desirably 1.0 equivalent per gram atom of aluminum of positive ions comprising manganese metal cations and hydrogen ions or ions capable of conversion to hydrogen ions.

The relative amount of hydrogen ions, or ions capable of conversion to hydrogen ions and manganese ions associated with the compositions of the instant invention is not narrowly critical and can vary over a fairly wide range. However, particularly effective catalysts are obtained when the manganese content ranges from 10 to 95% of the total equivalents of positive ions with 25 to 95% being preferred and 40% to 95% being particularly preferred.

Therefore, the most preferred embodiment of this invention resides in those compositions either alone or in a matrix having from 0.8 to 1.0 equivalent of ions of positive valence consisting of both hydrogen ions or ions capable of conversion to hydrogen ions and manganese cations wherein 40 to 85% of the total equivalents are represented by manganese cations.

The catalyst product, i.e., the treated aluminosilicate alone or in a matrix can be precalcined in an inert atmosphere near the temperature contemplated for conversion but may be calcined initially during use in the conversion process. Generally, the catalyst is dried between 150° F. and 600° F. and thereafter calcined in air or an inert atmosphere of nitrogen, helium, flue gas or other inert gas at temperatures ranging from about 500° F. to 1500° F. for periods of time ranging from 1 to 48 hours or more. It is to be understood that the active aluminosilicate can also be calcined prior to incorporation into the porous matrix.

It has been further found in accordance with the invention that catalysts of improved selectivity and having other beneficial properties in some hydrocarbon conversion, e.g., gas oil cracking, are obtained by subjecting the catalyst product to a mild steam treatment carried out at elevated temperatures of 800° F. to 1500° F. and preferably at temperatures of about 1000° F. to 1400° F. The treatment may be accomplished in an atmosphere of 100 percent steam or in atmosphere consisting of steam and a gas which is substantially inert to the aluminosilicate. The steam treatment apparently provides beneficial properties in the aluminosilicate compositions and can be conducted before, after or in place of the calcination treatment.

A similar treatment can be accomplished at lower temperatures and elevated pressures, e.g., 350–700° F. at 10 to about 200 atmospheres.

The high catalytic activities obtained by aluminosilicate compositions prepared in accordance with the invention are illustrated in connection with the cracking of a representative hydrocarbon charge. In the examples hereinafter set forth, the reference catalyst employed consisted of a conventional silica-alumina "bead" type cracking catalyst. The silica-alumina catalyst contained about 10 weight percent $Al_2O_3$ and the remainder $SiO_2$.

The cracking activity of the catalyst is further illustrated by its ability to catalyze the conversion of a Mid-Continent Gas Oil having a boiling range of 450–950° F. to gasoline having an end point of 410° F. Vapors of the gas oil are passed through the catalyst at temperatures of about 900° F. substantially at atmospheric pressure at a feed rate of 2 to 16 volumes of liquid oil per volume of catalyst per hour for ten minutes. The method of measuring the instant catalyst was to compare the various product yields obtained with such catalyst with yields of the same products given by conventional silica-alumina catalyst at the the same conversion level. The differences (Δ values) shown hereinafter represent the yields given by the present catalyst minus yields given by the conventional catalyst. In these tests, the catalyst compositions of the invention were precalcined at about 1000° F. prior to their evaluation as a cracking catalyst.

The catalysts prepared in accordance with the invention find extensive utility in a wide variety of hydrocarbon conversion processes including isomerization, dealkylation, alkylation, disproportionation, hydration of olefins, amination of olefins, hydrocarbon oxidation, dehydrogenation, dehydration of alcohols, desulfurization, hydrogenation, hydroforming, reforming, hydro-cracking, oxidation, polymerization and the like. The catalysts are exceptionally stable and are particularly useful in such of the above and related processes carried out at temperatures ranging from ambient temperatures of 70° F. up to 1400° F. including such processes in which the catalyst is periodically regenerated by burning off combustible deposits. Because of their high catalytic activities, the catalysts are especially useful for effecting various hydrocarbon conversion processes such as alkylation, for example, at relatively low temperatures with small amounts of catalyst, thus providing a minimum of undesirable side reactions and operating costs.

By way of example, the dehydrogenation of hydrocarbons such as propane, butylene, butane, pentane, cyclopentane, cyclohexane, methyl cyclohexane and the like, can be carried out at temperatures ranging from about 300° F. to 1025° F. under atmospheric or superatmospheric pressures with a space velocity (LHSV) from 0.2 to 5000. For dehydrogenation, metals and oxides and sulfides of metals such as platinum, palladium, rhodium, tungsten, iron, copper or nickel can be employed as promoters with the active aluminosilicate.

For the desulfurization of hydrocarbons, which involves largely hydrogenation, the oxides and sulfides of such metals as cobalt, molybdenum, chromium, iron, manganese, vanadium, copper, and mixtures thereof may be used in conjunction with the aluminosilicate. Desulfurization of shale distillates and the like may be carried out at temperatures between about 600° F. and 1000° F. under atmospheric or superatmospheric pressures with a space velocity (LHSV) between 0.2 and 50. The specific conditions within these ranges will vary with the feed stock undergoing desulfurization and the product desired.

The catalysts of the invention can be employed for hydrogenation of unsaturated aliphatic hydrocarbons, such as mono-olefins, diolefins, etc., to form the corresponding saturated hydrocarbons, hydrogenation of unsaturated cyclic hydrocarbons, and hydrogenation of unsaturated alcohols, ketones, acids, etc. For hydrogenation reactions, the temperature may range up to 1000° F. under a pressure of about 10 to 3,000 pounds or more, at a space velocity (LHSV) from about 0.5 to 5.0. The promoters which are normally employed with the aluminosilicate include the oxides of nickel, copper and iron and platinum group metals.

Hydrocracking of heavy petroleum residual stocks, cycle stocks, etc., may be carried out with active aluminosilicates promoted with about 0.05 to 10 percent by weight of a platinum metal such as platinum, palladium, rhodium, osmium, iridium and ruthenium or with oxides or sulfides of metals such as vanadium, nickel, cobalt and/or tungsten. The petroleum feed stock is cracked in the presence of the catalyst at temperatures between 400° F. and 825° F. using molar ratios of hydrogen to hydrocarbon charge in a range between 2 and 80. The pressure employed will vary between 10 and 2500 p.s.i.g. and the space velocity between 0.1 and 10.

The catalysts of the invention may be further utilized for the alkylation of aromatic hydrocarbons or phenols and the conversion of olefinic, acetylenic and naphthenic hydrocarbons. Alkylation of aromatics and phenols may be carried out at temperatures between 15° F. and 850° F. under pressures of 0 to 1000 p.s.i.g. The aromatizing reaction may be effected at temperatures between 350° F. and 1100° F. under atmospheric or elevated pressures. Other reactions in which the catalysts find utility include isomerization, polymerization, hydrogen transfer, oxidation of olefins to form the corresponding oxide, such as ethylene to ethylene oxide, propylene to propylene oxide, etc., as well as the oxidation of alcohol and ketones, etc. The catalyst composition of the invention also finds utility in processes for the oxidation of cyclohexane to adipic acid through the precursors cyclohexanone and cyclohexanol, as well as in the manufacture of caprolactam from caprolactone and ammonia. Additionally, the catalyst composites of the invention may be useful catalytically in processes for the production of vinyl chloride by oxidative-dehydrogenation reactions involving ethane and hydrogen chloride.

The following examples illustrate the best mode now contemplated for carrying out the invention.

*Example 1*

A synthetic crystalline aluminosilicate of the faujasite structure having a molecular composition of approximately $Na_2O \cdot Al_2O_3 \cdot 2.5 \pm 0.5 SiO_2$, was subjected to four separate contacts at 180° F. with an aqueous solution containing 25 weight percent $MnCl_2 \cdot 4H_2O$, each contact being carried out for a period of sixteen to twenty-four hours. The resulting composition was then subjected to four two-hour contacts at room temperature with an aqueous solution containing 2 percent by weight $MnCl_2 \cdot 4H_2O$ and 1 percent by weight ammonium chloride. After washing the composition substantially free of soluble chloride, a portion thereof was contacted continuously for two additional 24-hour periods with an aqueous solution containing 2 weight percent $MnCl_2 \cdot 4H_2O$ and 1 weight percent $NH_4Cl$. The composition was then washed with water until the effluent was substantially free of chloride ions, dried twenty-four hours at 230° F., and calcined in air for ten hours at 1000° F. Analysis indicated 1.0 weight percent of sodium.

The following table shows the cracking data for the catalyst when evaluated for cracking gas oil at 900° F. after having been treated with steam for twenty hours at 1225° F. at atmospheric pressure.

TABLE

CRACKING DATA

| | |
|---|---|
| Conversion, vol. percent | 63.2 |
| LHSV | 10.0 |
| $C_5$+gasoline, vol. percent | 55.7 |

DELTA ADVANTAGE

| | |
|---|---|
| $C_5$+gasoline, vol. percent | +11.0 |

*Example 2*

A synthetic crystalline aluminosilicate identified as Zeolite Y was base-exchanged with a solution containing 2 percent by weight manganese chloride·$4H_2O$, and 1 percent by weight ammonium chloride at 180° F. until the sodium content of the aluminosilicate was 1.25 weight percent. The manganese-acid aluminosilicate was then calcined ten hours at 1000° F. in air.

The above manganese-acid aluminosilicate was then incorporated into a matrix by methods consisting of mixing the following solutions through a mixing nozzle and forming a bead catalyst in the conventional bead-forming process. Solutions used in the preparation were:

(a) Silicate solution:
  16.42 lb. N brand silicate (8.9 wt. percent $Na_2O$, 28.9 wt. percent $SiO_2$, 62.2 wt. percent water)
  10.94 lb. water
  0.526 lb. of the manganese-acid aluminosilicate prepared as above (b) Acid solution:
  9.73 lb. aluminum trihydrate (ball milled for 72 hours in 30 wt. percent water slurry)
  17.94 lb. water
  2.4 lb. $H_2SO_4$ Solutions (a) and (b) were mixed together through a mixing nozzle adding 378 cc. per minute of the silicate solution at 57° F. to 392 cc. per minute acid solution at 39° F., forming a 6.95 pH hydrosol which gelled to a hydrogel in 3.4 seconds at 58° F. This hydrosol was formed into a bead hydrogel in a conventional bead-forming manner. The resulting bead hydrogel was then treated with a 2 percent by weight aqueous solution of acetic acid for one contact at 180° F. of 24 hours in duration followed by continuous exchange with 1 percent ammonium chloride for 24 hours. The exchange hydrogel was washed free of chloride and sulfate ions, dried at 450° F. in air for 16 hours, then calcined for 10 hours at 1000° F. and steamed 24 hours at 1200° F. with steam at 15 p.s.i.g. Analysis indicated 0.09 weight percent sodium.

The following table shows the cracking data obtained when the above catalyst was evaluated for cracking gas oil at 900° F.:

TABLE

CRACKING DATA

| | |
|---|---|
| Conversion, vol. percent | 39.7 |
| LHSV | 4 |
| $C_5$+gasoline, vol. percent | 34.4 |
| Total $C_4$'s, vol. percent | 7.8 |
| Dry gas, wt. percent | 3.5 |
| Coke, wt. percent | 1.3 |
| $H_2$, wt. percent | 0.07 |

DELTA ADVANTAGE

| | |
|---|---|
| $C_5$+gasoline, vol. percent | +3.8 |
| Total $C_4$'s, vol. percent | −1.5 |
| Dry gas, wt. percent | −1.4 |
| Coke, wt. percent | −0.7 |

*Example 3*

The procedure of Example 2 was repeated with the sole exception that the bead hydrogel was subjected to one 24-hour continuous contact with a 1 percent by weight aqueous solution of ammonium chloride in place of the acetic acid. The cracking data obtained when the catalyst was evaluated for the cracking of gas oil at 900° F. was as follows:

TABLE

CRACKING DATA

| | |
|---|---|
| Conversion, vol. percent | 39.5 |
| LHSV | 4 |
| $C_5$+gasoline, vol. percent | 34.5 |
| Total $C_4$'s, vol. percent | 7.4 |
| Dry gas, wt. percent | 3.8 |
| Coke, wt. percent | 0.9 |
| $H_2$, wt. percent | 0.01 |

DELTA ADVANTAGE

| | |
|---|---|
| $C_5$+gasoline, vol. percent | +4.0 |
| Total $C_4$'s, vol. percent | −1.8 |
| Dry gas, wt. percent | −1.1 |
| Coke, wt. percent | −1.0 |

*Example 4*

A synthetic crystalline aluminosilicate identified as Zeolite Y was contacted with an aqueous solution containing 2 percent by weight $MnCl_2 \cdot 4H_2O$ and 1 percent by weight ammonium chloride continuously at 180° F. The aluminosilicate was then washed with water until the effluent was substantially free of chloride ions and dried for 20 hours in air at 230° F., pelleted 4 by 10 mesh, calcined 10 hours at 1000° F. and then treated with steam for 24 hours at 1200° F. at 15 p.s.i.g. to yield a catalyst which analyzed 1.4 weight percent sodium and 6.58 weight percent manganese.

The following table shows the results obtained when the catalyst was evaluated for cracking gas oil at 900° F.

TABLE

CRACKING DATA

| | |
|---|---|
| Conversion, vol. percent | 50.5 |
| LHSV | 6 |
| $C_5$+gasoline, vol. percent | 43.5 |
| Total $C_4$'s, vol. percent | 8.5 |
| Dry gas, wt. percent | 4.6 |
| Coke, wt. percent | 2.2 |
| $H_2$, wt. percent | 0.02 |

Δ ADVANTAGE

| | |
|---|---|
| $C_5$+gasoline, vol. percent | +6.2 |
| Total $C_4$'s, vol. percent | −4.1 |
| Dry gas, wt. percent | −1.3 |
| Coke, wt. percent | −0.8 |

*Example 5*

Twenty-five parts by weight of a synthetic crystalline aluminosilicate identified as Zeolite 13X were dispersed into 75 parts by weight of a silica-alumina matrix in accordance with the following procedure.

An acid solution and a silicate solution were prepared having the following compositions:

ACID SOLUTION

| | Pounds |
|---|---|
| Water | 57.1 |
| $Al_2(SO_4)_3 \cdot 18H_2O$ | 4.23 |
| $H_2SO_4$ | 1.98 |

Specific gravity 1.053 at 83° F.

SILICATE SOLUTION

| | Pounds |
|---|---|
| (A) N-brand sodium silicate (8.9 wt. percent $Na_2O$, 28.9 wt. percent $SiO_2$, 62.2 wt. percent $H_2O$ | 46.4 |
| Water | 23.4 |
| (B) Water | 19.5 |
| Sodium aluminosilicate (55% solids at 1000° F.) | 8.86 |

Solutions A and B were mixed together to form a composite solution having a specific gravity of 1.197 at 76° F. The acid solution and the silicate solution were then mixed together through a mixing nozzle adding 340 cc. per minute of silicate solution at 60° F. to 320 cc. per minute acid solution at 45° F. forming a hydrosol having a gel time of 2 seconds at 68° F. and a pH of 8.5. The resulting hydrogel was then formed into a bead and thereafter subjected to two 24-hour continuous contacts at room temperature with an aqueous solution containing 2 percent by weight $MnCl_2 \cdot 4H_2O$ and 1 percent by weight ammonium chloride. The aluminosilicate catalyst was then washed with water until the effluent was substantially free of chloride ions, dried for 24 hours at 270° F. in air, calcined for 10 hours at 1000° F. and then treated with steam at atmospheric pressure for 20 hours at 1225° F. The final catalyst analyzed 0.41 weight percent sodium and 2.44 weight percent manganese. The following table shows the results obtained when the catalyst was evaluated for cracking gas oil at 900° F.

TABLE
CRACKING DATA

| | |
|---|---|
| Conversion, vol. percent | 40.0 |
| LHSV | 4.0 |
| $C_5$+gasoline, vol. percent | 34.8 |
| Total $C_4$'s, vol. percent | 7.2 |
| Dry gas, wt. percent | 3.6 |
| Coke, wt. percent | 1.5 |
| $H_2$, wt. percent | 0.09 |

Δ ADVANTAGE

| | |
|---|---|
| $C_5$+gasoline, vol. percent | +3.0 |
| Total $C_4$'s, vol. percent | −2.2 |
| Dry gas, wt. percent | −1.4 |
| Coke, wt. percent | −0.5 |

Example 6

The following example will illustrate the preparation of a matrix containing manganese and hydrogen and the incorporation therein of a crystalline aluminosilicate having associated therewith both manganese and hydrogen. A matrix was prepared utilizing the conventional bead-forming techniques involving gelling a sodium silicate solution with an acid alum solution in order to form a hydrogel containing 94 weight percent silica and 6 weight percent alumina.

The details of forming the hydrogel involve first mixing the following solutions together:

(A) Silicate solution: Pounds
N-brand sodium silicate (8.9 wt. percent $Na_2O$, 28.9 wt. percent $SiO_2$, 62.2 wt. percent $H_2O$) ---- 12.0
Water ---- 12.14
Specific gravity 1.165 at 81° F.

(B) Acid solution:
Water ---- 57.1
$Al_2(SO_4)_3 \cdot 18H_2O$ ---- 57.1
$H_2SO_4$ ---- 1.98
Specific gravity 1.056 at 80° F.

Solutions A and B were mixed together through a mixing nozzle adding 404 cc. per minute of the silicate solution at 75° F. with 410 cc. per minute of the acid solution at 42° F. forming an 8.5 pH hydrosol which gelled into a hydrogel in 3.6 seconds. The hydrogel was then formed into a bead by conventional methods and then contacted continuously for 24 hours at room temperature with a combined aqueous solution containing 2 percent by weight $MnCl_2 \cdot 4H_2O$ and 1 percent ammonium chloride in order to yield a silica-alumina matrix having associated therewith both manganese ions and ammonium ions. Forty grams of the aluminosilicate prepared in accordance with the procedure of Example 1 were then blended with 1351 grams of the hydrogel prepared as described above to form a composition containing 25 percent by weight aluminosilicate and 75 percent by weight matrix. The mixture was then dried at 275° F. for 20 to 22 hours in air, sized 4 by 10 mesh, calcined 10 hours at 1000° F. and then treated with steam at atmospheric pressure for 20 hours at 1225° F. The following table shows the results obtained when the above catalyst was evaluated for cracking gas oil at 900° F.

TABLE
CRACKING DATA

| | |
|---|---|
| Conversion, vol. percent | 58.7 |
| LHSV | 4 |
| $C_5$+gasoline, vol. percent | 49.1 |
| Total $C_4$'s, vol. percent | 11.8 |
| Dry gas, wt. percent | 5.2 |
| Coke, wt. percent | 2.7 |
| Hydrogen, wt. percent | 0.10 |

Δ ADVANTAGE OVER SILICA-ALUMINA

| | |
|---|---|
| $C_5$+gasoline, vol. percent | +7.3 |
| Total $C_4$'s, vol. percent | −3.9 |
| Dry gas, wt. percent | −2.4 |
| Coke, wt. percent | −1.5 |

What is claimed is:

1. A crystalline aluminosilicate containing both manganese cations and positive ions selected from the group consisting of hydrogen, hydrogen percursors and mixtures thereof.

2. The composition of claim 1 admixed with a porous matrix.

3. The composition of claim 2 wherein the porous matrix is an inorganic oxide gel.

4. The composition of claim 2 wherein the porous matrix is clay.

5. The composition of claim 2 wherein the porous matrix is selected from the group consisting of silica, alumina and combinations thereof.

6. A crystalline aluminosilicate having no more than 0.25 equivalent per gram atom of aluminum of alkali metal cations and containing both manganese ions and positive ions selected from the group consisting of hydrogen, hydrogen precursors and mixtures thereof.

7. A crystalline aluminosilicate having from 0.5 to 1.0 equivalent per gram atom of aluminum of ions of positive valence of which no more than 0.25 equivalent are represented by alkali metal cations with the remaining equivalents being represented by both manganese cations and the hydrogen ions.

8. The composition of claim 7 wherein the manganese cations represent between 10% and 95% of the total equivalents.

9. The composition of claim 7 admixed with a porous matrix.

10. The composition of claim 9 wherein the porous matrix is selected from the group consisting of silica, alumina and combinations thereof.

11. In the catalytic cracking of hydrocarbon oil to produce hydrocarbons of a lower boiling range, the improvement comprising contacting said oil under cracking conditions, with discrete particles of a crystalline aluminosilicate containing both manganese cations and positive ions selected from the group consisting of hydrogen, hydrogen precursors and mixtures thereof.

12. The process of claim 11 wherein the aluminosilicate is admixed with a porous matrix.

13. In the catalytic cracking of a hydrocarbon oil to produce hydrocarbons of a lower boiling range, the improvement of contacting said oil under cracking conditions with discrete particles of a crystalline aluminosilicate having from 0.5 to 1.0 equivalent per gram atom of aluminum of ions of positive valence of which no more than 0.25 equivalent are represented by alkali metal cations with the remaining equivalents being represented by both manganese cations and hydrogen ions.

14. The process of claim 13 wherein the aluminosilicate is admixed with a porous matrix.

15. The process of claim 14 wherein the porous matrix is selected from the group consisting of silica, alumina and combinations thereof.

References Cited by the Examiner
UNITED STATES PATENTS

| | | | |
|---|---|---|---|
| 3,140,249 | 7/1964 | Plank et al. | 208—120 |
| 3,140,251 | 7/1964 | Plank et al. | 208—120 |
| 3,140,252 | 7/1964 | Frilette et al. | 208—119 |

DELBERT E. GANTZ, *Primary Examiner.*

ALPHONSO D. SULLIVAN, *Examiner.*

A. RIMENS, *Assistant Examiner.*

Disclaimer 3,264,208.—*Charles J. Plank*, Woodbury, and *Edward J. Rosinski*, Deptford, N.J. CATALYTIC HYDROCARBON CONVERSION WITH THE USE OF A CRYSTALLINE ZEOLITE CONTAINING MANGANESE IONS. Patent dated Aug. 2, 1966. Disclaimer filed Nov. 20, 1968, by the assignee, *Mobil Oil Corporation*.

Hereby disclaims the terminal portion of the term of the patent subsequent to July 7, 1981.

[*Official Gazette April 1, 1969.*]